United States Patent
Hermans et al.

[15] 3,679,686
[45] July 25, 1972

[54] N-(BICYCLOAMINO-ALKANOYL)-ANILINES

[72] Inventors: Hubert Karel Frans Hermans, Beerse; Alfonsus Gillielmus Knaeps, Herentals; Joannes Josephus Maria Willems, Turnhout, all of Belgium

[73] Assignee: Janssen Pharmaceutica N.V.

[22] Filed: Sept. 9, 1970

[21] Appl. No.: 70,878

[52] U.S. Cl..................260/287 R, 260/283 R, 260/286 R, 260/293.54, 260/562 B, 424/258, 424/267
[51] Int. Cl......................................C07d 33/06, C07d 39/00
[58] Field of Search..........................260/287, 293.54, 293.26

[56] References Cited

UNITED STATES PATENTS 2,851,494  9/1958  Ehrhart...........................260/287 R
3,267,104  8/1966  Hermans et al..................260/268 BC
3,590,043  6/1971  Graf................................260/287 R

OTHER PUBLICATIONS

V. Braun et al., Berichte Vol. 61b, p. 1,423– 1,431 (1928)

Primary Examiner—Donald G. Daus
Attorney—Salvatore R. Conte, Herbert I. Sherman and Robert L. Minier

[57] ABSTRACT

Compounds of the class of N-(bicycloamino-alkanoyl)-anilines useful as local anesthetic and anti-arrhythmic agents.

15 Claims, No Drawings

N-(BICYCLOAMINO-ALKANOYL)-ANILINES

SUMMARY OF THE INVENTION

An object of this invention is to provide a new class of aminoalkyl anilides, in particular, N-(bicycloaminoalkanoyl)-anilines, which compounds possess anti-arrhythmic activity and local anesthetic properties similar in action to lidocaine. The subject compounds differ from the prior art aminoalkyl anilides in having a bicycloanino moiety as the amino function.

DESCRIPTION OF THE PREFERRED EMBODIMENTS:

The novel N-(bicycloamino-alkanoyl)-anilines of this invention may be structurally represented by the formula:

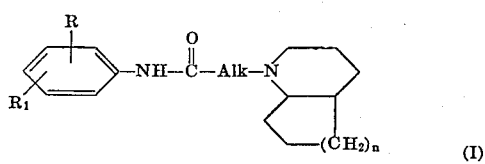

wherein R and $R_1$ are each a member selected from the group consisting of methyl and chloro; —Alk— is a member selected from the group consisting of —$CH_2$— and —$CH_2CH_2$—; and $n$ is a whole integer from 1 to 3. The pharmacologically active acid addition salts of (I) are also included within the scope of this invention.

Among the preferred species herein are those compounds of formula (I) wherein —Alk— is —$CH_2CH_2$—; and, more preferably, wherein —Alk— is —$CH_2CH_2$—, and $n$ is 1 or 2. The single most preferred species is the compound: trans-6'-chloro-2,3,4,4a,5,6,7,7a-octahydro-1H-1-pyrindine-1-propiono-o-toluidide, including its resolved (+) and (−) enantiomorphs.

The subject compounds (I) are prepared by the condensation of an appropriately selected reactive ester of an alkanol of the formula:

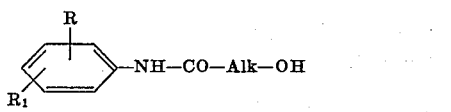

such as a halo compound of the formula:

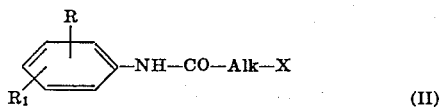

wherein Alk, R and $R_1$ are as previously described and X is halo, preferably chloro, with an appropriate bicycloamine of the formula:

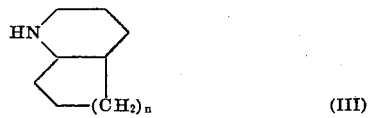

wherein $n$ is 1, 2 or 3. The condensation reaction, preferably under reflux conditions, is carried out in a suitable solvent such as a lower alkanol, a lower alkanone, preferably 4-methyl-2-pentanone, or an aromatic hydrocarbon such as benzene, toluene, xylene and the like. Since during the condensation an equivalent of acid (HX) is liberated, it is desirable to use an appropriate amount of a suitable base, e.g., an alkali metal carbonate, to combine with the acid released. The presence of a catalytic amount of potassium iodide is also desirable.

The compounds of formula (I) and of formula (III), due to the hydrogen atoms present at the bridged carbon atoms of the bicycloamino moiety, may obviously occur in stereochemical relationship as trans and cis isomers. In the cis-isomer, both hydrogens are on the same side of the molecule, and in the trans-isomer, the hydrogens are on opposite sides of the molecule. Thus, depending upon the cis-trans nature of the starting bicycloamine (III), the corresponding nature of the final product (I) will be determined.

The organic bases of formula (I) may be converted to the corresponding pharmaceutically acceptable acid addition salts by reaction with an appropriate inorganic acid, such as, for example, hydrochloric, hydrobromic, hydriodic, sulfuric and the like acids, or with an appropriate organic acid, such as, for example, acetic, propionic, glycolic, lactic, oxalic, malonic, tartaric, citric, sulfamic, ascorbic and the like acids. In turn, the salts of formula (I) may be converted to the corresponding base form by conventional treatment with suitable alkali.

The compounds of formula (III) have been previously described in the literature. For the most part, the formula (II) starting materials have been described in the literature heretofore. To the extend they are not, the formula (II) compounds are readily obtained by the condensation of an appropriate aniline of formula (IV) with an appropriate ω-halo-alkanoyl halide of formula (V), preferably the chloride, in glacial acetic acid. Upon addition of aqueous sodium acetate, the desired compound (II) precipitates.

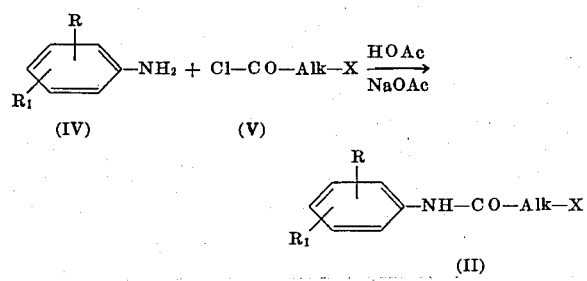

The novel aminoalkyl anilides (I) of this invention and the therapeutically active acid addition salts thereof have useful pharmacological properties and pharmaceutical applications in view of their anti-arrhythmic and local anesthetic properties.

With regard to anti-arrhythmic activity, the following method is used to determine the ability of the particular compound to markedly decrease ventricular arrhythmia in laboratory animals (dogs). Ligation of the anterior descendens branch is carried out under neuroleptanalgesia [1 cc. par 20 lbs. body weight of fentanyl (0.4 mg/cc.) and droperidol (20 mg/cc.)]. About 16 hours later, the dogs exhibit a multifocal ventricular arrhythmia which is recorded. During the test the dogs are curarized and ventilated. After a control period of 30 minutes, the compound to be tested is administered i.v. Using an initial dose of about 2.5 to 5.0 mg/kg body weight, followed by a second dose of 5.0 mg/kg 30 minutes later, a marked decrease or disappearance of the ventricular arrhythmia is observed with the compounds of formula (I) in base or salt form. In general, such response is observed to last for periods of about 0.5 – 4.0 hours.

In testing for anesthetic activity, male Wistar rats weighing about 195–205 grams are kept in metal cages and fasted for 16 hours before the start of the experiment, water being available ad libitum. The rats are then put into individual restraining triangular cages and the lower 5 cm. portion of the tail is marked with a black pencil. Immediately thereafter the pretreatment reaction time of each rat is measured in 0.5 second units with a stopwatch by immersing the lower 5 cm. portion of the tail in water at 55° C. The endpoint is the typical tail withdrawal response and the cut off time is 10 seconds. Normal reaction time of control animals never exceeds 6 seconds. Each rat is then given two injections in the base of the tail of 0.1 ml. solution each. The solution is either saline (control) or saline containing 2.5 mg. per ml. of the compound to be tested. The pH of each solution is between 6.5 and 7.3. Compounds that cannot be dissolved in saline at the required concentration and at pH 6.5–7.3 are not tested. The post-treatment reaction times of the tail withdrawal reflex are measured at different time intervals (from 1 to 240 minutes) after local injection; a positive response is said to have occurred if the reaction time exceeds 10 seconds. The onset of action is the time (in minutes) after treatment at which such a positive response is observed the first time and the duration of action is the time (in minutes) until no positive responses occur. A minimum of three animals are used for each compound and the median value of the three is recorded. The compounds of formula (I) and salts thereof suitable for testing hereunder (i.e., meeting the concentration and pH parameters) are found to have an onset of action of <5 minutes and a duration of action ranging from about 10–110 minutes at a dose level of 0.5 mg/rat. In contrast, the reference local anesthetic, lidocaine, was found to be inactive at 0.5 mg/rat. To have a pronounced anesthetic effect (i.e., reaction time of >10 seconds) a dosage concentration of 2 mg/rat was found necessary for lidocaine. Among the subject compounds having local anesthetic activity are the following:

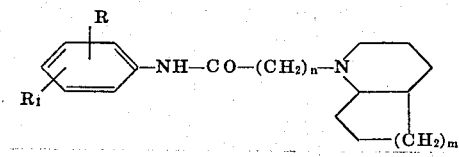

| R and $R_1$ | n | m | Form |
|---|---|---|---|
| 2,6-di-Me | 2 | 1 | trans-hydrochloride |
| 2-Me-6-Cl | 2 | 1 | trans-base |
| 2,6-di-Cl | 2 | 2 | trans-hydrochloride |
| 2-Me-6-Cl | 2 | 1 | cis-hydrochloride |
| 2,6-di-Me | 2 | 1 | cis-hydrochloride |
| 2,6-di-Cl | 2 | 1 | cis-hydrochloride |
| 2-Me-6-Cl | 2 | 3 | trans-oxalate |
| 2-Me-3-Cl | 2 | 1 | trans-base |
| 2-Me-4-Cl | 2 | 1 | trans-hydrochloride |
| 2,3-di-Me | 2 | 1 | trans-hydrochloride |
| 2-Me-6-Cl | 2 | 2 | cis-hydrochloride |
| 2,6-di-Me | 2 | 2 | trans-oxalate |
| 2-Me-6-Cl | 2 | 2 | cis-oxalate |
| 2,5-di-Me | 2 | 2 | trans-oxalate |
| 2,6-di-Me | 2 | 3 | cis-base |
| 2-Me-6-Cl | 2 | 2 | trans-hydrochloride |
| 2-Me-6-Cl | 2 | 1 | trans(−)-base |
| 2-Me-6-Cl | 2 | 1 | trans(+)-base |

The following examples are intended to illustrate, but not to limit, the scope of the present invention. Unless otherwise stated, all parts are by weight.

EXAMPLE I

A mixture of 6.5 parts of 2-chloroaceto-2',6'-xylidide, 3.75 parts of trans-octahydro-1H-1-pyrindine hydrochloride, 4.5 parts of sodium carbonate, 0.5 parts of potassium iodide and 160 parts of 4-methyl-2-pentanone is stirred and refluxed overnight. The reaction mixture is cooled and water is added. The organic layer is separated, dried, filtered and evaporated. The solid residue is boiled in diisopropylether with activated charcoal. The latter is filtered off over hyflo and after cooling the filtrate to room temperature, the product is crystallized. It is filtered off, washed with petroleumether, and dried, yielding trans-2,3,4,4a,5,6,7,7a-octahydro-1H-1-pyrindine-1-aceto-2',6' 132.7° C.

EXAMPLE II

A mixture of 7.2 parts of 2,6'-dichloroaceto-o-toluidide, 3.75 parts of trans-octahydro-1H-1-pyrindine hydrochloride, 4.5 parts of sodium carbonate, 0.5 parts of potassium iodide and 160 parts of 4-methyl-2-pentanone is stirred and refluxed overnight. The reaction mixture is cooled and water is added. The organic layer is separated, dried, filtered and evaporated. The residue is taken up in diisopropylether and boiled with activated charcoal. The solution is filtered over hyflo and the filtrate is acidified with an excess of 2-propanol previously saturated with gaseous hydrogen chloride. After dilution with diisopropylether and cooling to room temperature, the solid salt is crystallized. It is filtered off, washed with diisopropylether, and recrystallized twice from a mixture of 2-propanol and diisopropylether, yielding trans-6'-chloro-2,3,4,4a,5,6,7,7a-octahydro-1H-1-pyrindine-1-aceto-o-toluidide hydrochloride; m.p. 187.5° C.

EXAMPLE III

A mixture of 6.3 parts of 2-chloroaceto-2',6'-xylidide, 5 parts of trans-decahydroquinoline hydrochloride, 4.5 parts of sodium carbonate, 0.1 parts of potassium iodide and 200 parts of 4-methyl-2-pentanone is stirred and refluxed for 20 hours. The reaction mixture is cooled and water is added. The organic layer is separated, dried, filtered and evaporated. The solid residue is crystallized twice from a mixture of petroleumether and diisopropylether, yielding trans-3,4,4a,5,6,7,8,8a-octahydro-1(2H)quinolineaceto-2',6'-xylidide; m.p. 125.5° C.

EXAMPLE IV

A mixture of 7 parts of 3-chloropropiono-2',6'-xylidide, 3.75 parts of trans-octahydro-1H-1-pyrindine hydrochloride, 5.6 parts of sodium carbonate, 0.2 parts of potassium iodide and 160 parts of 4-methyl-2-pentanone is stirred and refluxed for 70 hours. The reaction mixture is cooled and water is added. The organic layer is separated, dried, filtered and evaporated. The oily residue is taken up in diisopropylether and extracted with a diluted hydrochloric acid solution. The aqueous acid phase is alkalized with sodium hydroxide solution and the product is extracted with diisopropylether. The organic extract is dried, filtered and evaporated. From the oily free base, trans-2,3,4,4a,-5,6,7,7a-octahydro-1H-1-pyrindine-1-propiono-2',6'-xylidide, the hydrochloride salt is prepared by treatment with 2-propanol previously saturated with gaseous hydrogen chloride. The crude solid salt is filtered off, dried overnight at 80° C. in vacuo and recrystallized from a mixture of 2-propanol and acetone, yielding trans-2,3,4,4a,5,6,7,7a-octahydro-1H-1-pyrindine-1-propiono-2',6'-xylidide hydrochloride hydrate; m.p. 205.5° C.

EXAMPLE V

A mixture of 7.8 parts of 3,6'-dichloropropiono-o-toluidide, 3.75 parts of trans-octahydro-1H-1-pyrindine hydrochloride, 5.6 parts of sodium carbonate, 0.5 parts of potassium iodide and 160 parts of 4-methyl-2-pentanone is stirred and refluxed for 70 hours. The reaction mixture is cooled and water is added. The organic layer is separated, dried, filtered and evaporated. The residue is taken up in diisopropylether, stirred with activated charcoal, filtered over hyflo and the filtrate is evaporated again. The residue is crystallized from diisopropylether, yielding trans-6'-chloro-2,3,4,4a,5,6,7,7a-octahydro-1H-1-pyrindine-1-propiono-o-toluidide; m.p. 104.1° C.

EXAMPLE VI

A mixture of 7.8 parts of 3,6'-dichloropropiono-o-toluidide, 3.7 parts of cis-octahydro-1H-1-pyrindine hydrochloride, 7.5 parts of sodium carbonate, 0.1 parts of potassium iodide and 200 parts of 4-methyl-2-pentanone is stirred and refluxed for 30 hours. The reaction mixture is cooled and water is added. The organic layer is separated, dried, filtered and evaporated. The residue is taken up in diisopropylether and the solution is acidified with an excess of 2-propanol previously saturated with gaseous hydrogen chloride. The crystallized salt is filtered off and recrystallized from a mixture of acetone and diisopropylether, yielding cis-6'-chloro- 2,3,4,4a,5,6,7,7a-octahydro-1H-1-pyrindine-1-propiono-o-toluidide hydrochloride; m.p. 190.7° C.

EXAMPLE VII

By repeating the procedure of Example VI, the following compounds of formula (I) can be prepared starting with equivalent quantities of the appropriate starting material of formula (II) and the appropriate bicycloamine of formula (III), the latter in the cis or trans form as indicated by the final product: trans-2',6'-dichloro-3,4,4a,5,6,7,8,8a-octahydro-1(2H)quinolinepropionanilide hydrochloride hydrate, m.p. 201.2° C.; and trans-6'-chloro-3,4,4a,5,6,7,8,8a-octahydro-1 (2H) quinolineaceto-o-toluidide hydrochloride hemihydrate, m.p. 210.9° C.

EXAMPLE VIII

A mixture of 8.3 parts of 3,2',6'-trichloropropionanilide, 3.75 parts of trans-octahydro-1H-1-pyrindine hydrochloride, 5 parts of sodium hydrogen carbonate and 160 parts of denatured ethanol is stirred and refluxed overnight. The reaction mixture is cooled and chloroform is added. The whole is filtered and the filtrate is evaporated. The residue is taken up in diisopropylether, boiled with activated charcoal, filtered over hyflo and the filtrate is evaporated again. The residue is dissolved in diisopropylether and after standing overnight at −20° C., the product is crystallized. It is filtered off, washed with diisopropylether and dried, yielding trans-2',6'-dichloro-2,3,4,4a,5,6,7,7a-octahydro-1H-1-pyrindine-1-propionanilide; m.p. 117.4° C.

EXAMPLE IX

A. A mixture of 7 parts of 3-chloropropiono-2',6'-xylidide, 3.75 parts of cis-octahydro-1H-1-pyrindine hydrochloride, 7.5 parts of sodium carbonate, 0.5 parts of potassium iodide and 160 parts of 4-methyl-2-pentanone is stirred and refluxed for 70 hours. The reaction mixture is cooled and water is added. The organic layer is separated, dried, filtered and evaporated. The residue is taken up in diisopropylether, boiled with activated charcoal, filtered over hyflo and the filtrate is evaporated again. The oily free base is converted into its hydrochloride salt in the conventional manner in 2-propanol. The crystallized salt is filtered off and recrystallized from 2-propanol, yielding cis-2,3,4,4a,5,6,7,7a-octahydro-1H-1-pyrindine-1-propiono-2',6'-xylidide hydrochloride; m.p. 202.2° C.

B. By repeating the process of Example IX-A, except that an equivalent quantity of 3,2',6'-trichloropropionanilide is substituted for the xylidide starting material used therein, there is obtained cis-2',6'-dichloro-2,3,4,4a,5,6,7,7a-octahydro-1H-1-pyrindine-1-propionanilide hydrochloride; m.p 203° C.

EXAMPLE X

A mixture of 6.5 parts of 2-chloroaceto-2',6'-xylidide, 3.75 parts of cis-octahydro-1H-1-pyrindine hydrochloride, 7.5 parts of sodium carbonate, 0.1 parts of potassium iodide and 200 parts of 4-methyl-2-pentanone is stirred and refluxed for 24 hours. The reaction mixture is cooled and water is added. The organic layer is separated, dried, filtered and evaporated. The residue is crystallized from diisopropylether, yielding cis-2,3,4,-4a,5,6,7,7a-octahydro-1H-1-pyrindine-1-aceto-2',6'-xylidide; m.p. 137.9° C.

EXAMPLE XI

A suspension of 6.96 parts of 3,6'-dichloropropiono-o-toluidide, 4.74 parts of trans-decahydro-1H-cyclohepta[b]pyridine hydrochloride, 5.04 parts of sodium hydrogen carbonate in 60 parts of ethanol is stirred and refluxed for 20 hours and allowed to cool. The solvent is removed in vacuo and the residue is dissolved in 2N hydrochloric acid solution. After extraction with diisopropylether, the aqueous phase is separated and alkalized with 50 !percent sodium hydroxide solution. The product is extracted with diisopropylether. The extract is dried and evaporated in vacuo. The base residue is converted into the oxalate salt in dimethyl ketone, yielding trans-6'-chloro-2,3,4,4a,5,6,7,8,9,9a-decahydro-1H-cyclohepta[b]pyrindine-1-propiono-o-toluidide oxalate; m.p. 151.1° C.

EXAMPLE XII

A. A mixture of 6.9 parts of 3-chloro-2',4'-propionoxylidide, 3.75 parts of trans-octahydro-1H-1-pyrindine, 3.2 parts of sodium hydrogen carbonate and 80 parts of denatured ethanol is stirred overnight at a gentle reflux. The reaction mixture is evaporated. The residue is divided between water and diisopropyl-ether. The organic phase is separated, dried, filtered and evaporated. The base residue is converted into the oxalate salt in acetone. The salt is filtered off and dried, yielding trans-2,3,4,4a,5,6,7,7a-octahydro-1H-1-pyrindine-1-propiono-2',4'-xylidide oxalate; m.p. 150.8° C.

B. The procedure of Example XII-A is followed, except that an equivalent quantity of 3-chloropropiono-2',5'-xylidide is used in place of the xylidide starting material used therein, to yield the product: trans-2,3,4,4a,5,6,7,7a-octahydro-1H-1-pyrindine-1-propiono-2',5'-xylidide oxalate; m.p. 166.5° C.

EXAMPLE XIII

A mixture of 7.6 parts of 3,3'-dichloropropiono-o-toluidide, 3.75 parts of trans-octahydro-1H-1-pyrindine, 3.2 parts of sodium hydrogen carbonate and 80 parts of denatured ethanol is stirred overnight at a gentle reflux. The reaction mixture is evaporated and the residue is divided between water and diisopropylether. The organic layer is separated, dried, filtered and evaporated. The solid residue is crystallized from diisopropylether, yielding trans-3'-chloro-2,3,4,4a,5,6,7,7a-octahydro-1H-1-pyrindine-1-propiono-o-toluidide; m.p. 91.7° C.

EXAMPLE XIV

A mixture of 6.98 parts of 3-chloro-2',6'-propionoxylidide, 5.28 parts of cis-decahydroquinoline, 8.4 parts of sodium hydrogen carbonate, 0.1 parts of potassium iodide and 200 parts of ethanol is stirred and refluxed for 2 days. The reaction mixture is evaporated. The residue is washed with water and extracted with ether. The extract is dried, filtered and the filtrate is acidified with 2-propanol previously saturated with gaseous hydrogen chloride. The crystallized salt is filtered off and recrystallized twice from 2-propanol, yielding cis-3,4,4a,5,6,7,8,8a-octahydro-1(2H)quinolinepropiono-2',6'-xylidide hydrochloride; m.p. 227.5° C.

EXAMPLE XV

A mixture of 7.6 parts of 3,4'-dichloropropiono-o-toluidide, 3.75 parts of trans-octahydro-1H-1-pyrindine, 3.2 parts of sodium hydrogen carbonate and 80 parts of denatured ethanol is stirred overnight at a gentle reflux. The reaction mixture is evaporated and the residue is divided between water and diisopropylether. The latter phase is separated, dried, filtered and evaporated. The oily base residue is taken up in diisopropylether and the solution is acidified with an excess of 2-propanol previously saturated with gaseous hydrogen chloride. The precipitated salt is filtered off and dried, yielding trans-4'-chloro-2,3,4,4a,5,6,7,7a-octahydro-1H-1-pyrindine-1-propiono-o-toluidide hydrochloride hydrate; m.p. 156.6° C.

EXAMPLE XVI

By repeating the procedure of Example XV, the following compounds of formula (I) can be prepared by starting with equivalent quantities of the appropriate starting material of formula (II) and the appropriate bicycloamine of formula (III), the latter in the cis or trans form as indicated by the final product:

trans-2,3,4,4a,5,6,7,7a-octahydro-1H-1-pyrindine-1-propiono-2',3'-xylidide hydrochloride, m.p. 77.2° C.; and cis-6'-chloro-3,4,4a,5,6,7,8,8a-octahydro-1(2H)quinoline-
propiono-oltoluidide hydrochloride, m.p. 219.7° C.

EXAMPLE XVII

A suspension of 6.36 parts of 3-chloropropiono-2',6'-xylidide, 4.74 parts of trans-decahydro-1H-cyclohepta-[b]pyridine hycrochloride and 5.04 parts of sodium hydrogen carbonate in 60 parts of ethanol is stirred and refluxed for 2 hours. The reaction mixture is poured onto hydrochloric acid solution 2N and the mixture is extracted with diisopropylether. The aqueous phase is alkalized with 50 percent sodium hydroxide solution and extracted with diidopropylether. The organic layer is dried and the solvent is evaporated in vacuo. The oily free base is converted into the oxalate salt in acetone. It is filtered off and recrystallized twice: first from acetone and then from a mixture of ethanol and acetone, yielding trans-2,3,4,4a,5,6,7,8,9,9a-decahydro-1H-cyclohepta[b]pyridine-1-propiono-2',6'-xylidide oxalate; m.p. 154.2° C.

B. By repeating the procedure of Example XVII-A, except that equivalent quantities of 3,6'-dichloropropiono-o-toluidide and the cis form of the pyridine derivative are used, the following product is obtained: cis-6'-chloro-2,3,4,4a,5,6,7,8,9,9a-decahydro-1H-cyclohepta[b]pyridine-1-propiono-o-toluidide oxalate; m.p. 161.4° C.

EXAMPLE XVIII

A mixture of 6.8 parts of 3-chloropropiono-2',5'-xylidide, 5 parts of trans-decahydroquinoline hydrochloride, 6 parts of sodium hydrogen carbonate, 0.1 parts of potassium iodide and 200 parts of ethanol is stirred and refluxed for 2 days. The reaction mixture is cooled and evaporated. The residue is taken up in water and diisopropylether. The organic phase is separated, dried, filtered and evaporated. From the oily free base, the oxalate salt is prepared in acetone. The crude salt is filtered off and crystallized from ethanol, yielding trans-3,4,4a,5,6,7,8,8a-octahydro-1(2H)quinolinepropiono-2',5'-xylidide oxalate; m.p. 119.8° C.

XIX

A suspension of 6.36 parts of 3-chloropropiono-2',6'-xylidide, 4.74 parts of cis-decahydro-1H-cyclohepta-[b]pyridine hydrochloride and 5.04 parts of sodium hydrogen carbonate in 60 parts of ethanol is stirred and refluxed for 48 hours. The reaction mixture is poured onto hydrochloric acid solution 10 percent and the solution is washed with diisopropylether. The aqueous phase is basified with a 50 percent sodium hydroxide solution and extracted with diisopropylether. The organic layer is dried and the solvent is removed in vacuo. The solid residue is crystallized from a mixture of petroleumether and benzene and recrystallized from a mixture of hexane and petroleumether, yielding cis-2,3,4,4a,5,6,7,8,9,9a-decahydro-1H-cyclohepta[b]pyridine-1-propiono-2',6'-xylidide; m.p. 108.5° C.

EXAMPLE XX

A mixture of 7.4 parts of 3,6'-dichloropropiono-o-toluidide, 5 parts of trans-decahydroquinoline hydrochloride, 8.5 parts of sodium hydrogen carbonate, 0.1 parts of potassium iodide and 200 parts of ethanol is stirred and refluxed for 2 days. The reaction mixture is cooled, filtered and the filtrate is evaporated. The residue is divided between water and diisopropylether. The organic layer is separated, dried, filtered and the filtrate is acidified with an excess of 2-propanol previously saturated with gaseous hydrogen chloride. An oily salt is separated, which solidifies on triturating in acetone. The solid salt is filtered off and crystallized from a mixture of 2-propanol and acetone, yielding about 6.5 parts of crude trans-6'-chloro-3,4,4a,5,6,7,8,8a-octahydro-1(2H)quinolinepropio no-o-toluidide hydrochloride. The free base is liberated again and the product is purified over column-chromatography, using a mixture of chloroform and methanol (9 : 1 by volume) as moving-liquid. The pure fractions are collected and converted again into the hydrochloride salt. After crystallization from 2-propanol, about 1.8 parts of pure trans-6'-chloro-3,4,4 a,5,6,7,8,8a-octahydro-1(2H)quinolinepropiono-o-toluidide hydrochloride are obtained; m.p. 190.8° C.

EXAMPLE XXI

A mixture of 9.6 parts of (±)-trans-6'-chloro-2,3,4,4a,5,6,7,7a-octahydro-1H-1-pyrindine-1-propiono-o-toluidide, 6.96 parts of (+)-camphor-10-sulfonic acid monohydrate and 40 parts of methyl ethyl ketone is heated till all solid enters solution. The solution is concentrated and the residue is poured onto diisopropylether. The whole is heated till crystallization sets in. The formed precipitate is filtered off (filtrate 1 is set aside) and dried in vacuo at 80° C., yielding about 9 parts of the crude camphor-10-sulfonate salt of (+)-trans-6'-chloro-2,3,4,4a,5,6,7,7a-octahydro-1H-1-pyrindine-1-propiono-o-toluidide; m.p. 137°–139° C.; [α]D = +19.5°.

The crude fraction of 9 parts is crystallized several times from a mixture of methyl ethyl ketone and diisopropylether (till constant rotation). The free base is then liberated in the conventional manner and after crystallization from 12 parts of n-hexane, the product is filtered off and dried in vacuo at 80° C., yielding about 0.5 parts of (+)-trans-6'-chloro-2,3,4,4a,5,6,7,7a-octahydro-1H-1-pyrindine-1-propiono-o-toluidide; m.p. 121.2° C., [α]D = +40°.

The filtrate 1, which was set aside and which contains the crude camphor-10-sulfonate salt of (−)-trans-6'-chloro-2,3,4,4a,5,6,7,7a-octahydro-1H-1-pyrindine-1-propiono-o-toluidide, is concentrated to dryness. The residue is stirred in 10 parts of ethyl acetate. The whole is filtered and the filtrate is concentrated to dryness, yielding 2 parts of the camphor-10-sulfonate salt of (−)-trans-6'-chloro-2,3,4,4a,5,6,7,7a-octahydro-1H-1-pyrindine-1-propiono-o-toluidide, [α]D = −8°. From the latter fraction, the free base is liberated in the conventional manner and crystallized from 7 parts of n-hexane, yielding after drying in vacuo at 80° C., about 0.1 parts of (−)-trans-6'-chloro-2,3,4,4a,5,6,7,7a-octahydro-1H-1-pyrindine-1-propiono-o-toluidide; m.p. 120.8° C.; [α]D = −41.5°.

EXAMPLE XXII

This example demonstrates the synthetic method which may be used for making the starting compounds of formula (II).

A. To a solution of 81 parts of 2,6-dichloroaniline in 400 parts of glacial acetic acid are added dropwise 70 parts of 2-chloropropionylchloride at a temperature of about 15° C. After the addition is complete, the whole is stirred for 30 minutes at room temperature. Then there are added 500 parts of a solution of 200 parts of sodium acetate in 500 parts of water. The precipitated product is filtered off, washed on the filter with water and dried, yielding 3,2',6'-trichloropropionanilide; m.p. 143° C.

B. To a stirred and cooled solution of 60.5 parts of 2,5-xylidine in 400 parts of acetic acid are added dropwise 69.9 parts of 3-chloropropionyl chloride, while keeping the temperature below 10° C. (external cooling). Upon completion, stirring at room temperature is continued for 2 hours. Then there are added 500 parts of a solution of 200 parts of sodium acetate in 500 parts of water. The precipitated product is filtered off, washed with water and dissolved in chloroform. The organic solution is washed several times with water, dried, filtered and evaporated in vacuo. The residue is crystallized from a mixture of methylene chloride and petroleumether, yielding 3-chloropropiono-2',5'-xylidide; m.p. 129.8° C.

C. To a stirred and cooled solution of 121.12 parts of 2,4-xylidine in 800 parts of glacial acetic acid are added 96.1 parts of 3-chloropropionylchloride at 10° C. The whole is stirred for 40 minutes. Then there are added 400 parts of sodium acetate dissolved in 1,000 parts of water and stirring is continued overnight. The precipitated product is filtered off, stirred in water, filtered off again, washed with water and dried. After recrystallization from a mixture of diisopropylether and acetone, 3-chloro-2',4'-propionoxylidide is obtained; m.p. 125.5° C.

D. To a stirred and cooled solution of 121.18 parts of 2,3-xylidine in 800 parts of glacial acetic acid are added 96.1 parts of 3-chloropropionylchloride at 10° C. After stirring for 40 minutes, there are added 400 parts of sodium acetate dissolved in 1,000 parts of water. The whole is stirred overnight. The precipitated product is filtered off and stirred for one hour in water. The product is filtered off again, washed once more with water and dried. After recrystallization from a mixture of diisopropylether and acetone, 3-chloro-2',3'-propionoxylidide is obtained; m.p. 95.5° C.

We claim:
1. A chemical compound selected from the group consisting of an N-(bicycloamino-alkanoyl)-aniline of the formula:

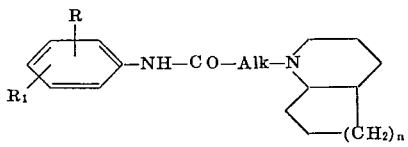

wherein R and R₁ are each a member selected from the group consisting of methyl and chloro; Alk is a member selected from the group consisting of —CH₂— and —CH₂CH₂—; and n is a whole integer from 1 to 3; and the pharmacologically active acid addition salts thereof.

2. A chemical compound selected from the group consisting of an N-(bicycloamino-alkanoyl)-aniline of the formula:

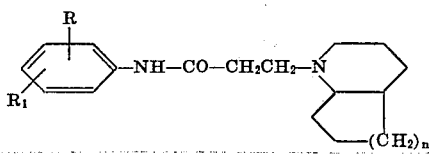

wherein each of R and R₁ is a member selected from the group consisting of methyl and chloro, and n is the whole integer 1 or 2, and the therapeutically active acid addition salts thereof.

3. Trans-3,4,4a,5,6,7,8,8a-octahydro-1(2H)-quinolineaceto-2',6'-xylidide.
4. Trans-2,3,4,4a,5,6,7,7a-octahydro-1H-1-pyrindine-1-propiono-2',6'-xylidide.
5. Trans-6'-chloro-2,3,4,4a,5,6,7,7a-octahydro-1H-1-pyrindine-1-propiono-o-toluidide.
6. Trans-6'-chloro-3,4,4a,5,6,7,8,8a-octahydro-1(2H)quinolineaceto-o-toluidide.
7. Trans-2',6'-dichloro-2,3,4,4a,5,6,7,7a-octahydro-1H-1-pyrindine-1-propionanilide.
8. Trans-2',6'-dichloro-3,4,4a,5,6,7,8,8a-octahydro-1(2H)quinolinepropionanilide.
9. Cis-6'-chloro-2,3,4,4a,5,6,7,7a-octahydro-1H-1-pyrindine-1-propiono-o-toluidide.
10. Trans-2,3,4,4a,5,6,7,8,9,9a-decahydro-1H-cyclohepta[b]pyridine-1-propiono-2',6'-xylidide. oxalate.
11. Cis-2,3,4,4a,5,6,7,8,9,9a-decahydro-1H-cyclohepta[b]pyridine-1-propiono-2',6'-xylidide.
12. Cis-6'-chloro-3,4,4a,5,6,7,8,8a-octahydro-1(2H)quinolinepropiono-o-toluidide.
13. Trans-6'-chloro-3,4,4a,5,6,7,8,8a-octahydro-1(2H)quinolinepropiono-o-toluidide.
14. (−)-Trans-6'-chloro-2,3,4,4a,5,6,7,7a-octahydro-1H-1-pyrindine-1-propiono-o-toluidide.
15. (+)-Trans-6'-chloro-2,3,4,4a,5,6,7,7a-octahydro-1H-1-pyrindine-1-propiono-o-toluidide.

* * * * *